(12) United States Patent  
Boss et al.

(10) Patent No.: US 9,158,590 B2  
(45) Date of Patent: Oct. 13, 2015

(54) DYNAMICALLY ACQUIRING COMPUTING RESOURCES IN A NETWORKED COMPUTING ENVIRONMENT

(75) Inventors: Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/204,892

(22) Filed: Aug. 8, 2011

(65) Prior Publication Data

US 2013/0042004 A1 Feb. 14, 2013

(51) Int. Cl.
G06F 15/173 (2006.01)
G06F 9/50 (2006.01)

(52) U.S. Cl.
CPC .................... *G06F 9/5061* (2013.01)

(58) Field of Classification Search
None
See application file for complete search history.

(56) References Cited

U.S. PATENT DOCUMENTS

| | | | |
|---|---|---|---|
| 8,606,897 B2* | 12/2013 | Ferris et al. | 709/223 |
| 2003/0167270 A1* | 9/2003 | Werme et al. | 707/10 |
| 2003/0167295 A1* | 9/2003 | Choo | 709/226 |
| 2004/0181794 A1* | 9/2004 | Coleman et al. | 718/104 |
| 2008/0080396 A1 | 4/2008 | Meijer et al. | |
| 2009/0276771 A1* | 11/2009 | Nickolov et al. | 717/177 |
| 2010/0050172 A1 | 2/2010 | Ferris | |
| 2010/0192157 A1* | 7/2010 | Jackson | 718/104 |
| 2010/0332262 A1 | 12/2010 | Horvitz et al. | |
| 2011/0016214 A1* | 1/2011 | Jackson | 709/226 |
| 2011/0125894 A1* | 5/2011 | Anderson et al. | 709/224 |

(Continued)

FOREIGN PATENT DOCUMENTS

WO 2011008219 A1 1/2011

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Jason K. Gee  
*Assistant Examiner* — Olanrewaju Bucknor  
(74) *Attorney, Agent, or Firm* — William E. Schiesser; Keohane & D'Alessandro PLLC; Maxine L. Barasch

(57) ABSTRACT

The present invention provides an approach for dynamically acquiring computing resources in a networked computing environment (e.g., a cloud computing environment) based on infrastructure/computing resource needs. In a typical embodiment, a set of computing resources (needed to process a set of workloads) external to a first portion of a networked computing environment is identified. Once identified, electronic negotiations with at least one provider of the set of computing resources may be held for utilizing the provider's set of computing resources to process the set of workloads. In general, the negotiations are based on at least one resource registration (setting forth terms for utilizing the set of computing resources such as usage rates, usage limitations, etc.) associated with the at least one provider stored in at least one computer data structure. Responsive to successful completion of the negotiations, the set of computing resources will be associated with the first portion.

19 Claims, 5 Drawing Sheets

(56) References Cited

U.S. PATENT DOCUMENTS

| | | | |
|---|---|---|---|
| 2011/0137805 A1 | 6/2011 | Brookbanks et al. | |
| 2011/0138047 A1 | 6/2011 | Brown et al. | |
| 2011/0138048 A1 | 6/2011 | Dawson et al. | |
| 2011/0145094 A1 | 6/2011 | Dawson et al. | |
| 2011/0145153 A1 | 6/2011 | Dawson et al. | |
| 2011/0145413 A1 | 6/2011 | Dawson et al. | |
| 2011/0153727 A1 | 6/2011 | Li | |
| 2011/0231899 A1* | 9/2011 | Pulier et al. | 726/1 |
| 2011/0320233 A1* | 12/2011 | Arnette et al. | 705/7.15 |
| 2012/0137002 A1 | 5/2012 | Ferris et al. | |
| 2012/0198073 A1* | 8/2012 | Srikanth et al. | 709/226 |

OTHER PUBLICATIONS

Mark J. Stephens, PCT International Search Report, International Application No. PCT/CA2012/050508, International Filing Date Jul. 26, 2012, 3 pages.

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 17 pages.

* cited by examiner

DYNAMICALLY ACQUIRING COMPUTING RESOURCES IN A NETWORKED COMPUTING ENVIRONMENT

TECHNICAL FIELD

In general, the present invention relates to computing resource optimization. Specifically, the present invention relates to the dynamic acquisition of computing resources in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Presently, many networked computing services (e.g., cloud computing services) are provided through infrastructure provisioning (e.g., within a relatively static hardware pool) whereby operating systems and computer software applications can be deployed and reconfigured. In a typical cloud computing environment, application images can be installed and overwritten, Internet Protocol (IP) addresses can be modified, and real and virtual processors are allocated to meet changing resource requirements. However, challenges can exist in that cloud computing environments are typically static entities whose infrastructures are fully managed. As such, optimization of the cloud computing environments typically occur through static acquisition and installation of new hardware and/or other resources. Such an approach may be inefficient and/or not economically viable.

SUMMARY

Embodiments of the present invention provide an approach for dynamically acquiring computing resources in a networked computing environment (e.g., a cloud computing environment) based on infrastructure/computing resource needs. In a typical embodiment, a set of computing resources (needed to process a set of workloads) external to a first portion of a networked computing environment is identified. Once identified, electronic negotiations with at least one provider of the set of computing resources may be held for utilizing the provider's set of computing resources to process the set of workloads. In general, the negotiations are based on at least one resource registration (setting forth terms for utilizing the set of computing resources such as usage rates, usage limitations, etc.) associated with the at least one provider stored in at least one computer data structure. Responsive to successful completion of the negotiations, the set of computing resources will be associated with the first portion. Such association can occur through various methods such as utilizing computing resources in public cloud environments, expanding the first portion to include the set of computing resources, etc.

A first aspect of the present invention provides a computer-implemented method for dynamically acquiring computing resources in a networked computing environment, comprising: identifying a set of computing resources external to a first portion of the networked computing environment, the set of computing resources being needed to process a set of workloads associated with the first portion; negotiating with at least one provider of the set of computing resources for utilizing the at least one provider's set of computing resources to process the set of workloads, the negotiating being based on at least one resource registration associated with the at least one provider stored in at least one computer data structure; and responsive to the negotiating being successful, associating the set of computing resources with the first portion of the networked computing environment.

A second aspect of the present invention provides a system for dynamically acquiring computing resources in a networked computing environment, comprising: a memory medium comprising instructions; a bus coupled to the memory medium; and a processor coupled to the bus that when executing the instructions causes the system to: identify a set of computing resources external to a first portion of the networked computing environment, the set of computing resources being needed to process a set of workloads associated with the first portion; negotiate with at least one provider of the set of computing resources for utilizing the at least one provider's set of computing resources to process the set of workloads, the negotiation being based on at least one resource registration associated with the at least one provider stored in at least one computer data structure; and responsive to the negotiation being successful, associating the set of computing resources with the first portion of the networked computing environment.

A third aspect of the present invention provides a computer program product for dynamically acquiring computing resources in a networked computing environment, the computer program product comprising a computer readable storage media, and program instructions stored on the computer readable storage media, to: identify a set of computing resources external to a first portion of the networked computing environment, the set of computing resources being needed to process a set of workloads associated with the first portion; negotiate with at least one provider of the set of computing resources for utilizing the at least one provider's set of computing resources to process the set of workloads, the negotiation being based on at least one resource registration associated with the at least one provider stored in at least one computer data structure; and responsive to the negotiation being successful, associating the set of computing resources with the first portion of the networked computing environment.

A fourth aspect of the present invention provides a method for deploying a system for dynamically acquiring computing resources in a networked computing environment, comprising: providing a computer infrastructure being operable to: identify a set of computing resources external to a first portion of the networked computing environment, the set of computing resources being needed to process a set of workloads associated with the first portion; negotiate with at least one provider of the set of computing resources for utilizing the at least one provider's set of computing resources to process the set of workloads, the negotiation being based on at least one resource registration associated with the at least one provider stored in at least one computer data structure; and responsive to the negotiation being successful, associating the set of computing resources with the first portion of the networked computing environment.

BRIEF DESCRIPTION OF THE DRAWINGS

These and other features of this invention will be more readily understood from the following detailed description of the various aspects of the invention taken in conjunction with the accompanying drawings in which.

Figure 1:
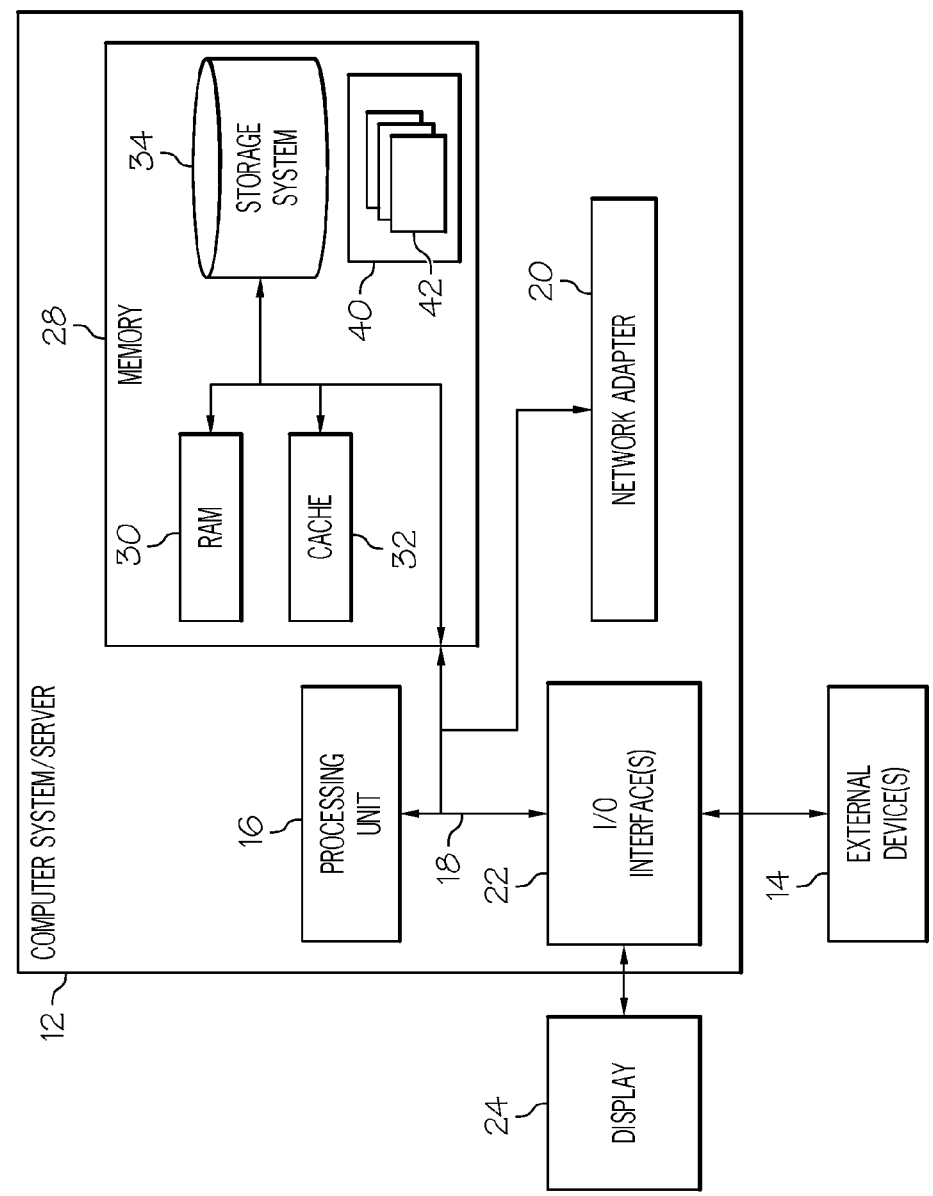
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for dynamically acquiring computing resources in a networked computing environment (e.g., a cloud computing environment) based on infrastructure/computing resource needs. In a typical embodiment, a set of computing resources (needed to process a set of workloads) external to a first portion of a networked computing environment is identified. Once identified, electronic negotiations with at least one provider of the set of computing resources may be held for utilizing the provider's set of computing resources to process the set of workloads. In general, the negotiations are based on at least one resource registration (setting forth terms for utilizing the set of computing resources such as usage rates, usage limitations, etc.) associated with the at least one provider stored in at least one computer data structure. Responsive to successful completion of the negotiations, the set of computing resources will be associated with the first portion. Such association can occur through various methods such as utilizing computing resources in public cloud environments, expanding the first portion to include the set of computing resources, etc.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wired, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
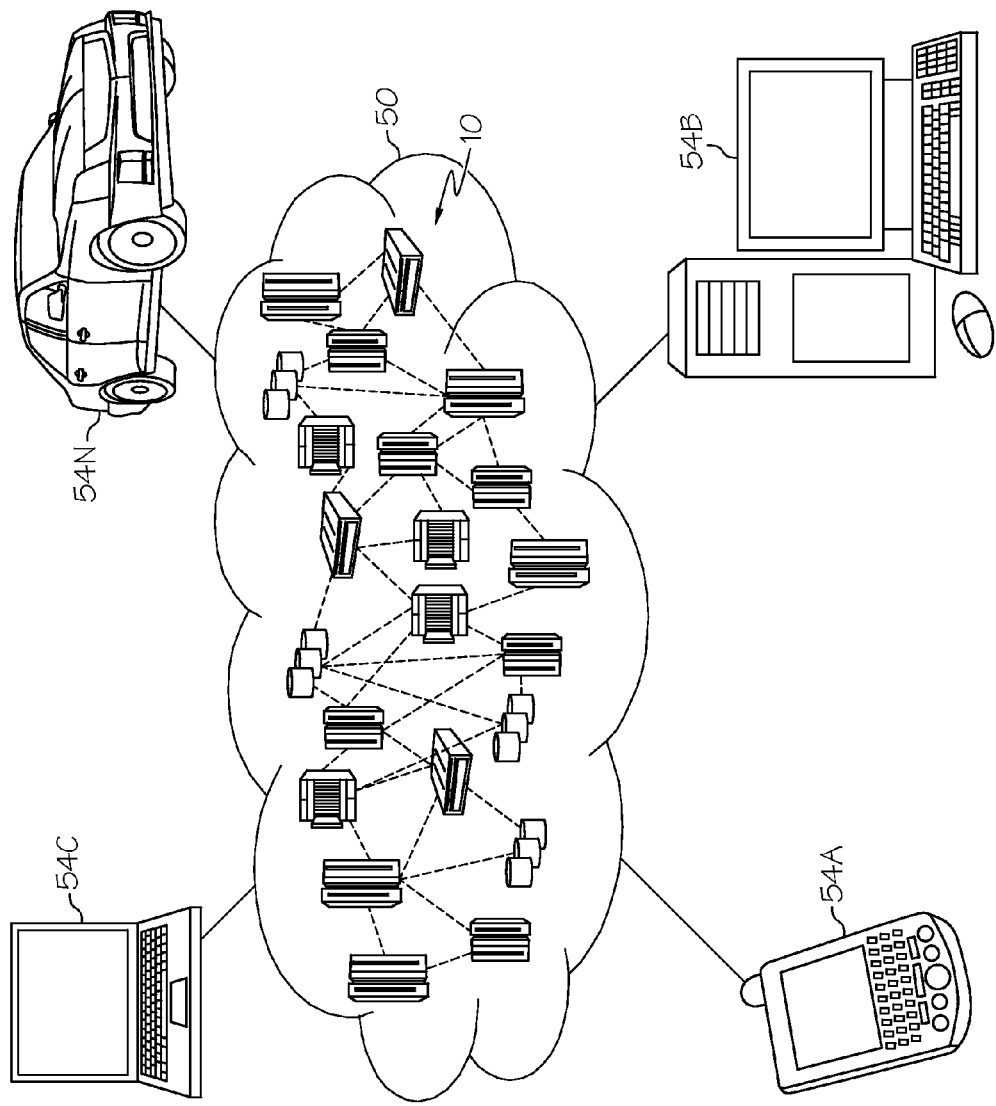
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
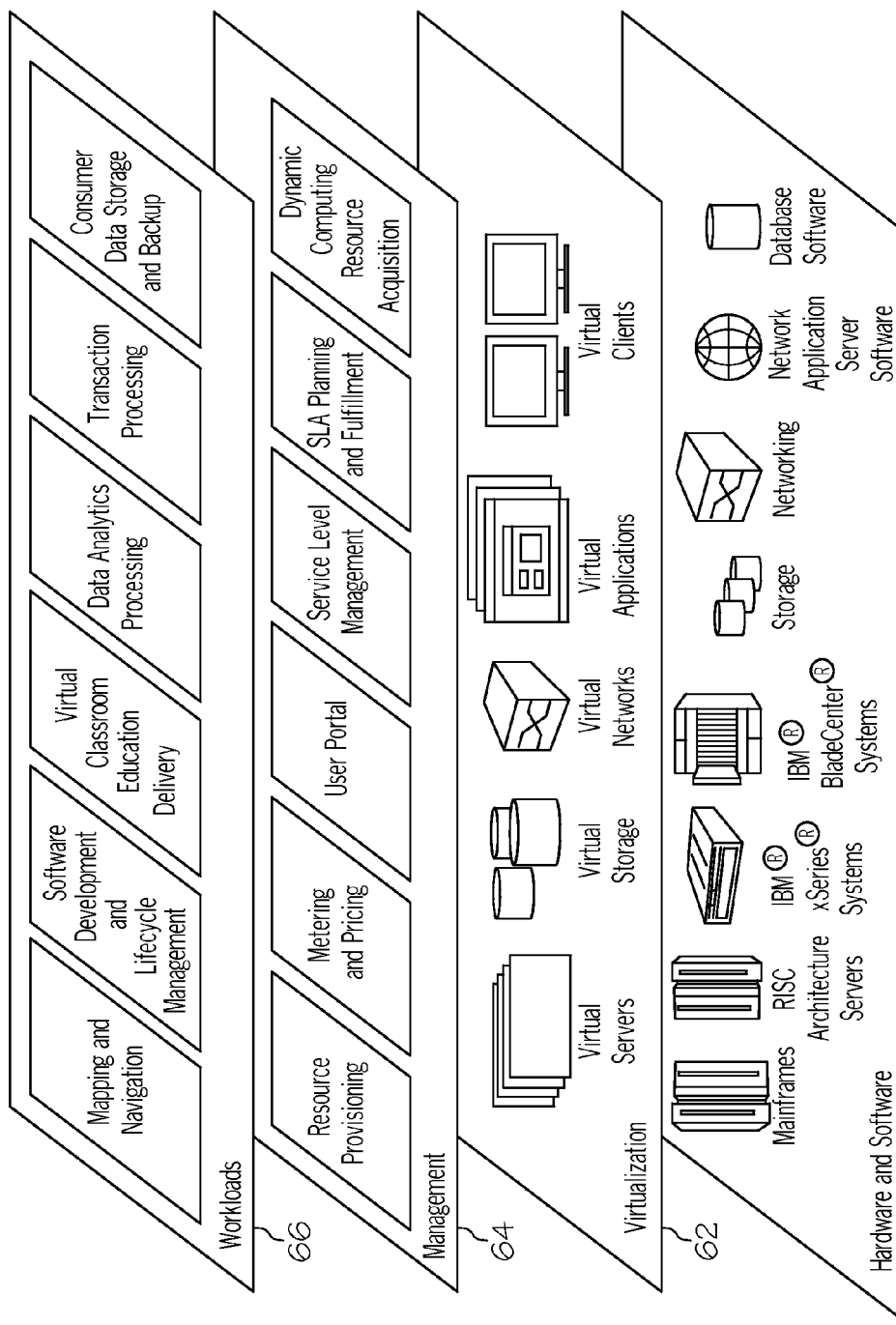
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is dynamic computing resource acquisition function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the dynamic computing resource acquisition functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide an approach for dynamic acquisition of computing resources for workload processing among portions and/or regions of a networked computing environment (e.g., between cloud environments).

Figure 4:
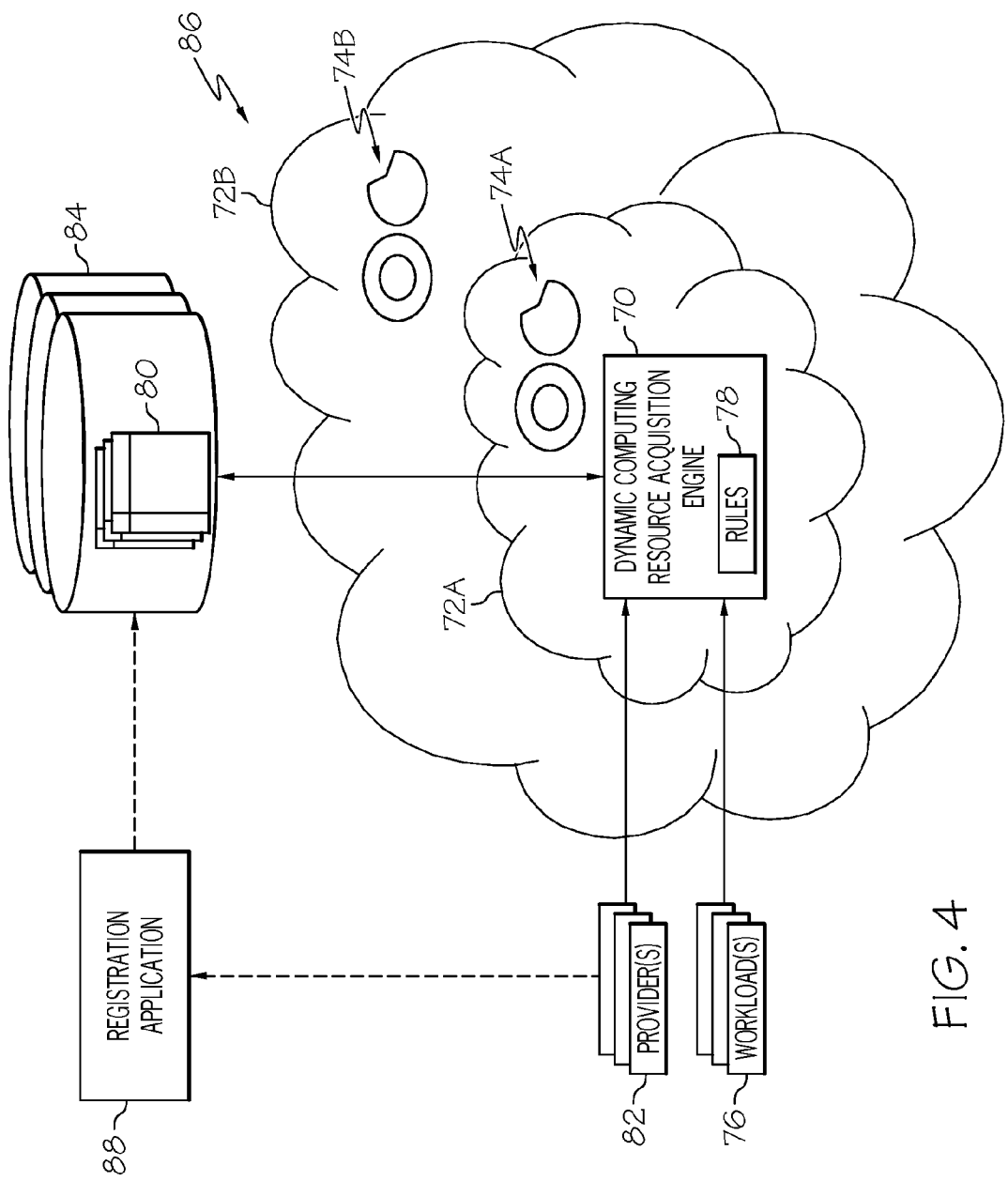
FIG. 4 depicts a system diagram according to an embodiment of the present invention.

Referring now to FIG. 4, A system diagram according to an aspect of the present invention is shown. As depicted, a dynamic computing resource acquisition engine (engine 70) is shown. In general, engine 70 can be implemented as program 40 on computer system 12 of FIG. 1 and can implement the functions recited herein as depicted in management layer 64 of FIG. 3. In general, engine 70 comprises a rules engine that processes a set (at least one) of rules 78 and utilizes a set of computing resource registrations 80 (stored on a set of computer data structures 84) to determine if and how to acquire a set of computing resources 74B from one portion/cloud environment 72B of networked computing environment 86 to supplement a set of computing resources 74A in another portion/cloud environment 72A of networked computing environment 86 to process/handle a set of workloads 76 associated with portion 72A. It is understood that although portions 72A-B are shown within a single cloud environment 84, this need not be the case. Rather, portions 74A-B could be distributed among two or more cloud environments.

Along these lines, engine 70 will perform multiple functions. Specifically, among other functions, engine 70 will: determine a needed capacity for processing the set of workloads 76; determine an available capacity of computing resources 74A in first portion 72A; identify a set of computing resources 74B external to a first portion 72A of networked computing environment 86 in response to the needed capacity exceeding the available capacity; (e.g., electronically) negotiate with at least one provider 82 of the set of computing resources 74B to utilize the set computing resources 74B to process the set of workloads 76; and/or responsive to the negotiation, associate the set of computing resources of provider(s) 82 with the first portion and/or workload(s) 76. As will be further discussed below, the negotiation with provider(s) 82 is typically held electronically and can be based on at least one resource registration 80 associated with provider(s) 80 stored in at least one computer data structure 84.

As will be further discussed below, the needed capacity can be identified based upon historical data for previous workloads similar to the set of workloads (e.g., stored in the at least one computer data structure 84). Moreover, resource registration(s) 80 can be provided in multiple ways. For example, engine 70 can enable functionality (e.g., user interfaces, etc.) for provider(s) 82 to provide resource registrations 80 and store the same in computer storage device(s) 84. Alternatively, resource registrations 80 can be received in storage device(s) 84 via a separate (e.g., third party) registration application 88 that can work in conjunction with engine 70. Regardless, resource registration(s) 80 typically set forth a set of terms for utilizing the set of computing resources such as pricing/costs of usage, limitations on usage, etc.

In any event, set of rules 78 typically enables the functionality set forth herein. Some of this functionality is discussed in additional detail below.

A. Computing Resource Discovery/Identification

Hardware Selection Method: As indicated above, engine 70 will utilize set of rules 78 to identify set of computing resources 74B external to portion 72A. Such identification serves the purpose of supplementing set of computing resources 74A associated with portion 72A to process set of workloads 76 (e.g., where the available capacity of set of computing resources 74A is exceeded by the capacity needed to fully process of workloads 76). Regardless, this method identifies the hardware and software needed (referred to herein as computing resources and/or infrastructure) to process/handle workloads (e.g., computing environment expansions and/or workload relocations). Likewise, some workloads may be driven by underlying hardware or middleware needs, further refining those systems which could be included in the cloud expansion. This method determines which computing resource types are required of possible workloads candidates. Additionally, this method may select optimal hardware configurations based on historical run-time analysis. For example, engine 70 may discern that an allocated instance runs for shorter periods of time if a disk subsystem meets a minimum Input/Output Operations per Second (IOPS) threshold. Another analysis may indicate that a system with a specific CPU speed results in shorter allocation time. Yet further analysis may discover that disk speed or CPU speed do not impact allocation time spans, and therefore, any hardware may be acceptable. Engine 70 will apply set of rules 78 and perform analyses such as these and configure the corresponding environment appropriately.

B. Negotiation of Computing Resource Acquisition

Cloud Offering Method: Through this method, various static cloud owners/providers 82 may offer their IaaS as expansion/association targets for cloud environments in need of such infrastructure. In one embodiment, providers 82 of static clouds register their cloud with engine 70. During this registration process, providers 82 can set a price for usage, hours of availability, types of workload restrictions, origin or workload restrictions, hardware types and hardware profiles (CPU speed, disk I/O, etc). Such prices and conditions may be set and reset at varying times, either through outreach from the static cloud (computing resources) provider 82, or in response to queries from the dynamic cloud provider. Additionally, during registration, the computing resources provider makes known methods that may be invoked to allocate or de-allocate an instance on their cloud. In some embodiments, these methods may be transmitted in Extensible Markup Language (XML) and describe a set of remote methods to invoke for allocation and de-allocation.

In one embodiment, allocation and de-allocation methods may be invoked using standard Hypertext Transfer Protocol (HTTP) calls by the embodiments of present invention. In other embodiments, a standard Application Programming Interface (API) would be made available to create such allocation and de-allocation calls. Yet other systems may include run-time code for the embodiments of present invention invention to execute allocation and de-allocation. This run-time code may be composed of scripts or other executable functions. In yet another embodiment, the dynamic cloud provider could provide adapters that connect to the static cloud providers using documented APIs.

Along similar lines, embodiments of the present invention enable a cloud or meta-cloud provider to dynamically consume the static computing resources of other clouds. This relationship enables a meta-cloud provider to provide automatic price advantages to their customers while further reducing computing resources investment for the meta-cloud provider. The dynamic cloud acquisition further enables the embodiments of present invention to enhance customer satisfaction by allocating the most optimal computing resources for the customer even as the dynamic cloud requirements change.

C. Computing Resources Acquisition (e.g., Environment Expansion)

Cloud Acquisition Method: In this method, the embodiments of present invention consume computing resources on public clouds environments (e.g., commercial e-commerce providers who offer such services), without requiring registration. These cloud providers are manually entered into the proposed system along with catalog entries describing the supported operating systems, hardware, storage and performance metrics. Additionally, allocation and de-allocation methods are stored within the system. These methods provide embodiments of present invention with the necessary steps to allocate and de-allocate cloud computing resources as well as the steps necessary to migrate workload to these cloud environments. These methods may be a set of HTTP calls or a set of scripts to allocate and de-allocate instances.

Cloud Auditing Method: This method audits the various sub-clouds environments (i.e., computing resources components in use by the dynamic cloud provider) to determine whether the sub-clouds are meeting their obligations. For example, embodiments of the present invention may deploy a test instance on a sub-cloud to verify the sub-cloud is meeting specifications such as disk IOPS, CPU speed, etc. If the sub-cloud is not meeting the registered specifications, remediation tasks may occur such as removing the sub-cloud from potential expansion targets, or alerting the computing resources provider that they are not meeting their Service Level Agreements (SLAs).

Cloud Selection Method: This method selects which of the various cloud providers 82's computing resources 74B may be used for a particular need. As noted above, each cloud provider either submits an SLA for their cloud service or the cloud auditing method is used to determine a uniform measure across all cloud providers. Based on application characteristics, price, location, and other factors, a particular cloud is selected for use. The application characteristics may include CPU requirements, disk performance, etc. These characteristics may be specified by the application owners on submission, or automatically determined based upon historical data and/or owner profiles. Cloud providers that cannot meet these performance requirements are excluded from selection. Once the list of clouds is narrowed based on performance, the cloud destination is selected based on price, and potentially, location. The following example illustrates how the concepts contained in this disclosure might be used.

Illustrative Example

Assume that an Illustrative dynamic cloud provider, "Nebulous cloud" has no physical hardware but has written adapters to connect to cloud environment "A", private cloud environment "B", and public cloud "C". Nebulous cloud has to evacuate virtual machines (VMs) in a particular data center because of a potential outage due to a hurricane. Nebulous cloud determines which applications need to stay in close proximity to each other, for instance keeping a customer's DB2® and WebSphere® VM's in the same location (DB2®, WebSphere® and related terms are trademarks of IBM Corporation in the United States and/or other countries). In such a case, Nebulous cloud moves these VM's to public cloud "C" while migrating other applications to private cloud "A" Nebulous Cloud then backfills the empty VM's. A design workload could then run and send data from verification runs to a backup point (e.g., every "n" minutes) so that significant work is not lost should power fail.

Figure 5:
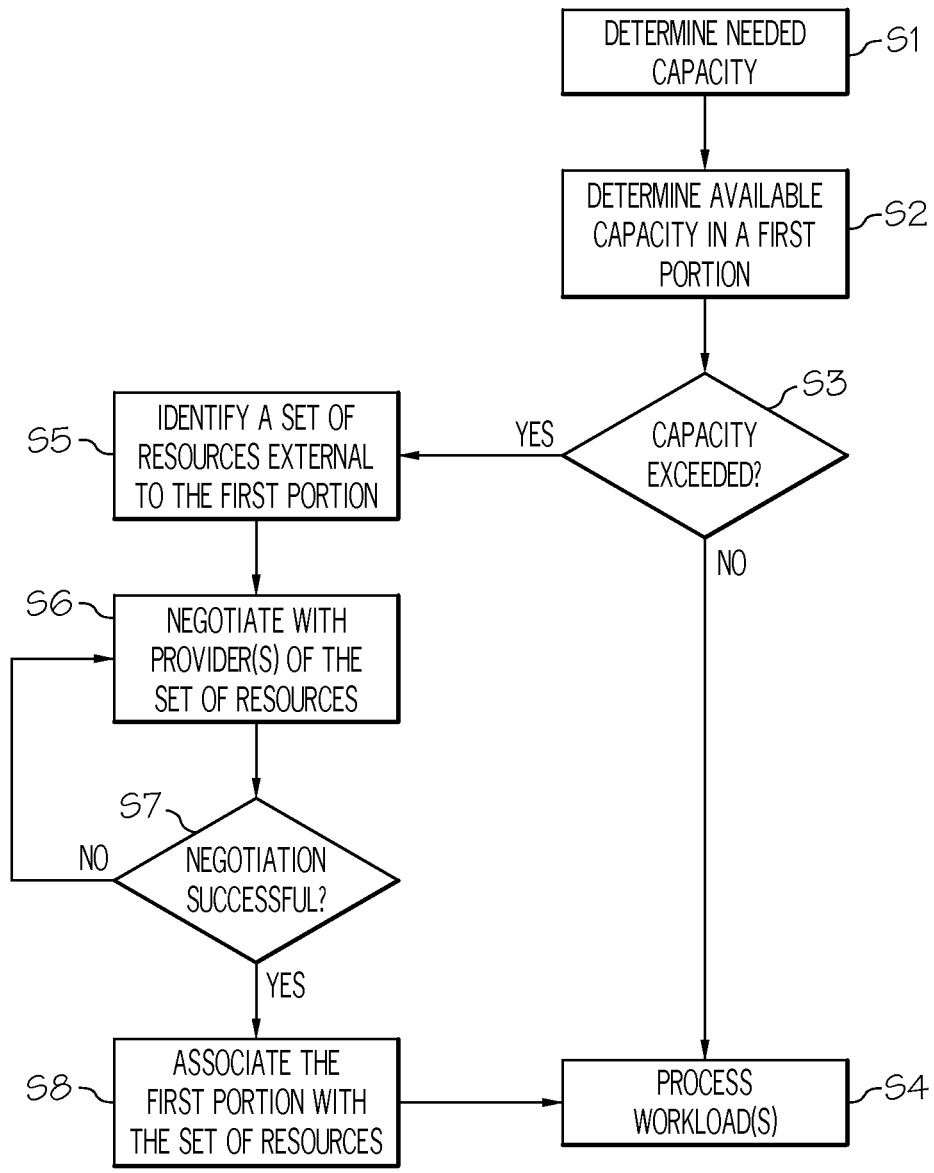
FIG. 5 depicts a method flow diagram according to an embodiment of the present invention.

Referring now to FIG. 5, a method flow diagram according to an embodiment of the present invention is shown. In step S1, a needed capacity for processing a set of workloads is determined. In step S2, an available capacity of computing resources in a first portion of a networked computing environment is determined. In step S3, it is determined whether the needed capacity exceeds the available capacity. If not, the set of workloads is processed in the first portion in step S4. If, however, the needed capacity exceeds the available capacity, a set of computing resources external to the first portion of the networked computing environment is identified in step S5. In step S6, electronic negotiations are conducted with at least one provider of the set of computing resources for the utilization the set of computing resources to process the set of workloads. As indicated above, the negotiation is based on at least one resource registration associated with the at least one provider stored in at least one computer data structure. Along these lines, in step S7, it is determined whether the negotiation is successful. If not, electronic negotiations can be reattempted in step S6 (e.g., with the same computing resource provider and/or a new computing resource provider). In any event, responsive to the negotiation being successful, the set of computing resources is associated with the first portion and or the set of workloads in step S8, and the workload is processed using such set of resources.

While shown and described herein as a dynamic computing resource acquisition solution, it is understood that the invention further provides various alternative embodiments. For example, in one embodiment, the invention provides a computer-readable/useable medium that includes computer program code to enable a computer infrastructure to provide dynamic computing resource acquisition functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide dynamic computing resource acquisition functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for dynamic computing resource acquisition. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for dynamically acquiring computing resources in a networked cloud computing environment, comprising:
    identifying, based on historical data and performance requirements in a service level agreement, a set of cloud computing resources external to a first portion of the networked cloud computing environment, the set of computing resources being needed to process a set of workloads associated with the first portion, the historical data comprising data related to previous workloads similar to the set of workloads, the performance requirements comprising central processing unit requirements and disk performance requirements, the identifying comprising:
    determining a sub-set of a set of cloud providers that are capable of meeting the performance requirements, and
    selecting from the sub-set at least one cloud provider based on a price and location of the at least one cloud provider;
    negotiating with the at least one cloud provider for utilizing the set of cloud computing resources to process the set of workloads, the negotiating being based on at least one resource registration associated with the at least one cloud provider stored in at least one computer data structure;
    auditing sub-clouds of the at least one cloud provider;
    deploying a test instance on at least one of the sub-clouds;
    determining, based on a result of the deployment, whether the at least one sub-cloud is meeting the performance requirements; and
    responsive to the negotiating being successful, expanding the first portion of the networked cloud computing environment to include the set of cloud computing resources;
    wherein the first portion is a first public cloud computing environment, and the set of cloud computing resources is located in a second public cloud computing environment; and
    wherein each of the first cloud computing environment and the second cloud computing environment comprises a shared pool of configurable computing resources enhanced by a set of abstraction layers which make disparate devices appear to an end-consumer as a single pool of seamless resources, the abstraction layers comprising a hardware and software layer, a virtualization layer, a management layer, and a workloads layer.

2. The computer-implemented method of claim 1, the historical data being stored in at least one computer data structure.

3. The computer-implemented method of claim 1, further comprising:
    receiving the at least one resource registration from the at least one cloud provider; and
    storing the at least one resource registration in the at least one computer data structure.

4. The computer-implemented method of claim 3, the at least one resource registration setting forth a set of terms for utilizing the set of computing resources.

5. The computer-implemented method of claim 1, further comprising:
    determining a needed capacity for processing the set of workloads; and
    determining an available capacity of computing resources in the first portion, the set of computing resources external to the first portion being identified in response to the needed capacity exceeding the available capacity.

6. The computer-implemented method of claim 1, further comprising:
    if it is determined that the at least one sub-cloud is not meeting the performance requirements, performing a set of remediation tasks, the remediation tasks comprising:
        removing the at least one sub-cloud from potential expansion targets, and
        alerting the at least one cloud provider that the at least one sub-cloud is not meeting the performance requirements.

7. A system for dynamically acquiring computing resources in a networked computing environment, comprising:
    a memory medium comprising instructions;
    a bus coupled to the memory medium; and
    a processor coupled to the bus that when executing the instructions causes the system to:
    identify, based on historical data and performance requirements in a service level agreement, a set of cloud computing resources external to a first portion of the networked cloud computing environment, the set of computing resources being needed to process a set of workloads associated with the first portion, the historical data comprising data related to previous workloads similar to the set of workloads, the performance requirements comprising central processing unit requirements and disk performance requirements, the identifying comprising:
        determine a sub-set of a set of cloud providers that are capable of meeting the performance requirements, and
        select from the sub-set at least one cloud provider based on a price and location of the at least one cloud provider;
    negotiate with the at least one cloud provider for utilizing the set of cloud computing resources to process the set of workloads, the negotiation being based on at least one resource registration associated with the at least one cloud provider stored in at least one computer data structure;
    audit sub-clouds of the at least one cloud provider;
    deploy a test instance on at least one of the sub-clouds;
    determine, based on a result of the deployment, whether the at least one sub-cloud is meeting the performance requirements; and
    responsive to the negotiating being successful, expand the first portion of the networked cloud computing environment to include the set of cloud computing resources;

wherein the first portion is a first public cloud computing environment, and the set of cloud computing resources is located in a second public cloud computing environment; and wherein each of the first cloud computing environment and the second cloud computing environment comprises a shared pool of configurable computing resources enhanced by a set of abstraction layers which make disparate devices appear to an end-consumer as a single pool of seamless resources, the abstraction layers comprising a hardware and software layer, a virtualization layer, a management layer, and a workloads layer.

8. The system of claim 7, the historical data being stored in at least one computer data structure.

9. The system of claim 7, the memory medium further comprising instructions for causing the system to:
  receive the at least one resource registration from the at least one cloud provider; and
  store the at least one resource registration in the at least one computer data structure.

10. The system of claim 9, the at least one resource registration setting forth a set of terms for utilizing the set of computing resources.

11. The system of claim 7, the memory medium further comprising instructions for causing the system to:
  determine a needed capacity for processing the set of workloads; and
  determine an available capacity of computing resources in the first portion, the set of computing resources external to the first portion being identified in response to the needed capacity exceeding the available capacity.

12. The system of claim 7, the memory medium further comprising instructions for causing the system to:
  if it is determined that the at least one sub-cloud is not meeting the performance requirements, perform a set of remediation tasks, the remediation tasks comprising:
    remove the at least one sub-cloud from potential expansion targets, and
    alert the at least one cloud provider that the at least one sub-cloud is not meeting the performance requirements.

13. A computer program product for dynamically acquiring computing resources in a networked computing environment, the computer program product comprising a computer readable storage device, and program instructions stored on the computer readable storage device, to:
  identify, based on historical data and performance requirements in a service level agreement, a set of cloud computing resources external to a first portion of the networked cloud computing environment, the set of computing resources being needed to process a set of workloads associated with the first portion, the historical data comprising data related to previous workloads similar to the set of workloads, the performance requirements comprising central processing unit requirements and disk performance requirements, the identifying comprising:
    determine a sub-set of a set of cloud providers that are capable of meeting the performance requirements, and
    select from the sub-set at least one cloud provider based on a price and location of the at least one cloud provider;
  negotiate with the at least one cloud provider for utilizing the set of cloud computing resources to process the set of workloads, the negotiation being based on at least one resource registration associated with the at least one cloud provider stored in at least one computer data structure;
  audit sub-clouds of the at least one cloud provider;
  deploy a test instance on at least one of the sub-clouds;
  determine, based on a result of the deployment, whether the at least one sub-cloud is meeting the performance requirements; and
  responsive to the negotiating being successful, expand the first portion of the networked cloud computing environment to include the set of cloud computing resources;
  wherein the first portion is a first public cloud computing environment, and the set of cloud computing resources is located in a second public cloud computing environment; and
  wherein each of the first cloud computing environment and the second cloud computing environment comprises a shared pool of configurable computing resources enhanced by a set of abstraction layers which make disparate devices appear to an end-consumer as a single pool of seamless resources, the abstraction layers comprising a hardware and software layer, a virtualization layer, a management layer, and a workloads layer.

14. The computer program product of claim 13, the historical data being stored in at least one computer data structure.

15. The computer program product of claim 13, the computer readable storage device further comprising instructions to:
  receive the at least one resource registration from the at least one cloud provider; and
  store the at least one resource registration in the at least one computer data structure.

16. The system of claim 15, the at least one resource registration setting forth a set of terms for utilizing the set of computing resources.

17. The computer program product of claim 13, the computer readable storage device further comprising instructions to:
  determine a needed capacity for processing the set of workloads; and
  determine an available capacity of computing resources in the first portion, the set of computing resources external to the first portion being identified in response to the needed capacity exceeding the available capacity.

18. The computer program product of claim 13, the computer readable storage device further comprising instructions to:
  if it is determined that the at least one sub-cloud is not meeting the performance requirements, perform a set of remediation tasks, the remediation tasks comprising:
    remove the at least one sub-cloud from potential expansion targets, and
    alert the at least one cloud provider that the at least one sub-cloud is not meeting the performance requirements.

19. A method for deploying a system for dynamically acquiring computing resources in a networked computing environment, comprising:
  providing a computer infrastructure being operable to:
    identify, based on historical data and performance requirements in a service level agreement, a set of cloud computing resources external to a first portion of the networked cloud computing environment, the set of computing resources being needed to process a set of workloads associated with the first portion, the historical data comprising data related to previous workloads similar to the set of workloads, the performance requirements comprising central processing unit requirements and disk performance requirements, the identifying comprising:

determine a sub-set of a set of cloud providers that are capable of meeting the performance requirements, and select from the sub-set at least one cloud provider based on a price and location of the at least one cloud provider;

negotiate with at least one cloud provider for utilizing the set of cloud computing resources to process the set of workloads, the negotiation being based on at least one resource registration associated with the at least one cloud provider stored in at least one computer data structure;

audit sub-clouds of the at least one cloud provider;

deploy a test instance on at least one of the sub-clouds;

determine, based on a result of the deployment, whether the at least one sub-cloud is meeting the performance requirements; and responsive to the negotiating being successful, expand the first portion of the networked cloud computing environment to include the set of cloud computing resources;

wherein the first portion is a first public cloud computing environment, and the set of cloud computing resources is located in a second public cloud computing environment; and wherein each of the first cloud computing environment and the second cloud computing environment comprises a shared pool of configurable computing resources enhanced by a set of abstraction layers which make disparate devices appear to an end-consumer as a single pool of seamless resources, the abstraction layers comprising a hardware and software layer, a virtualization layer, a management layer, and a workloads layer.

* * * * *